United States Patent
Okamoto et al.

(10) Patent No.: US 6,818,342 B1
(45) Date of Patent: Nov. 16, 2004

(54) METHOD OF FORMING PROTECTIVE COATING ON CELL SAFETY VALVE ELEMENT, CELL SAFETY VALVE ELEMENT COATED WITH PROTECTIVE FILM, CELL SEALING PLATE USING THE ELEMENT, AND ENCLOSED CELL USING THE PLATE

(75) Inventors: Hiroaki Okamoto, Yamaguchi-ken (JP); Yoshiyuki Sugimoto, Yamaguchi-ken (JP); Kinji Saijo, Yamaguchi-ken (JP); Hiroaki Kawamura, Yamaguchi-ken (JP)

(73) Assignee: Toyo Kohan Co., Ltd., Tokyo (JP)

( * ) Notice: Subject to any disclaimer, the term of this patent is extended or adjusted under 35 U.S.C. 154(b) by 0 days.

(21) Appl. No.: 09/601,474

(22) PCT Filed: Jan. 29, 1999

(86) PCT No.: PCT/JP99/00393

§ 371 (c)(1),
(2), (4) Date: Oct. 17, 2000

(87) PCT Pub. No.: WO99/40637

PCT Pub. Date: Aug. 12, 1999

(30) Foreign Application Priority Data

Feb. 3, 1998 (JP) .......................................... 10/035371

(51) Int. Cl.⁷ .............................................. H01M 2/08
(52) U.S. Cl. ............................. 429/56; 429/53; 429/57; 429/72; 429/82
(58) Field of Search ............................. 429/53, 55, 56, 429/57, 64, 66, 72, 82, 174, 171, 173, 94, 180, 65

(56) References Cited

U.S. PATENT DOCUMENTS 3,994,749 A * 11/1976 Decker et al. ................ 429/53
5,580,679 A * 12/1996 Tanaka ........................ 429/185
6,001,504 A * 12/1999 Batson et al. ............... 429/163
6,444,248 B1 * 9/2002 Franklin et al. ............. 426/513

FOREIGN PATENT DOCUMENTS

| JP | 02-284349 | * 11/1990 | ............ H01M/2/04 |
| JP | 3131050 | 12/1991 | |
| JP | 5-84025 U | 11/1993 | |
| JP | 5314959 | 11/1993 | |
| JP | 9293490 | 11/1997 | |

OTHER PUBLICATIONS

Saijo et al. WO 98/56052, Dec. 10, 1998.*

* cited by examiner

Primary Examiner—Frankie L. Stinson
Assistant Examiner—Monique Wills
(74) Attorney, Agent, or Firm—Browdy and Neimark, P.L.L.C.

(57) ABSTRACT

A method of forming a protective coating on a cell safety valve element by coating the cell safety valve element with a protective film to protect metal portions thereof against corrosion, a cell safety valve element coated with a protective film, a cell sealing plate using the element, and an enclosed cell using the plate. The safety valve element comprises a coating (3) obtained by applying an organic paint onto at least one surface of the cell safety valve element (10) consisting of a metal base plate (1) having a through hole (4) drilled therein and a metal foil (2) laminated on the metal base plate (1) so as to block the through hole (4). The sealing plate is formed by bringing the cell safety valve element (10), on which a protective coating (3) comprising an organic resin film is formed, into contact with a cell exterior can sealing plate (6), in which the through hole (4) acting as a safety valve port is drilled so that the through hole (4) in the metal base plate of the cell safety valve element (10) and the through hole (7) in the sealing plate face each other and bonding the both at a portion around the through hole (7) in the sealing plate to form the cell sealing plate. The enclosed cell is formed by fitting and supporting the cell sealing plate at the inner periphery of an opening of the cell exterior can in which are housed an electrode body consisting of a positive electrode, a negative electrode and a separator together with an electrolyte to block the opening in the cell exterior can.

11 Claims, 8 Drawing Sheets

(a)

(b)

METHOD OF FORMING PROTECTIVE COATING ON CELL SAFETY VALVE ELEMENT, CELL SAFETY VALVE ELEMENT COATED WITH PROTECTIVE FILM, CELL SEALING PLATE USING THE ELEMENT, AND ENCLOSED CELL USING THE PLATE

REFERENCE TO RELATED APPLICATION

The present application is the national stage under 35 U.S.C. 371 of PCT/JP99/00393, filed Jan. 29, 1999.

A method of forming a protection film for a safety valve element, a safety valve element which is coated with a protection film, a closing plate for battery using same and a closed battery using same

INDUSTRIAL FIELD

The present invention relates to a method of forming a protection film of a safety valve element, a safety valve element covered with a protection film, and a battery using same which prevents from corrosion of a metal part of a safety valve element used for bursting-proof of a closed battery.

BACKGROUND OF THE INVENTION

A closed battery using an alkali metal like lithium as a material for positive and negative electrode has been widely used in recent years. These batteries need sealed structure so that an alkali metal like lithium may not react with moisture in an atmosphere, but a completely closed structure sometimes causes a bursting of battery provoked abnormally elevated pressure in the battery when the battery is exposed to high temperature or it is inappropriately handled at the charge or discharge.

It is disclosed that a closing plate for a battery provided with a bursting-proof mechanism or a safety valve for releasing a pressure in a battery when it is abnormally elevated.

For example, Japanese Patent Laid-open Publication No.HEI-5-84025 discloses a safety valve device for a closed battery which provide a gas releasing opening in a positive electrode terminal constituting a closing plate for a battery and a metal foil welded for bursting-proof.

In this closing plate for a battery, when a pressure in a battery is elevated, a metal foil for bursting-proof ruptures so that a pressure releases through a gas releasing opening applied in a positive electrode terminal.

When electrolyte is filled up in a battery container, electrolyte sometimes scatters and adheres the outside of it. Especially, in case of lithium ion battery, a non-aqueous electrolyte including lithium fluoride as a supporting electrolyte is used for electrolyte.

This fluoride does not attack a metal part of a battery container and a safety valve, but it has strong corrosion so as to absorb moisture in atmosphere and to change into hydrofluoric acid.

For this reason, it is a problem that an electrolyte scatters and adhere an outside of a battery container, especially a metal a foil of a safety valve element, and that a thin metal foil is perforated by corrosion.

The present invention provides a method of forming a protection film of a safety valve element for a closed battery, a safety valve element covered by a protect film, a closing plate using same and a closed battery using same which prevents from corrosion of a metal part by covering the safety valve element for battery by a protection film.

DISCLOSURE OF THE INVENTION

The present invention is a method of forming a protection film of a safety valve element for a battery comprising a metal substrate having perforated pores and a metal foil laminated on said metal substrate so as to cover said perforated pores, wherein an organic coating is coated on at least one side of it.

Further, it is a method of forming a protection film of a safety valve element of a battery comprising a metal substrate having perforated pores and a metal foil laminated on said metal substrate so as to cover said perforated pores, wherein an organic resin film is laminated on at least one side of it.

Furthermore, it is a method of forming a protection film of a safety valve element of a battery comprising a metal substrate having perforated pores and a metal foil laminated on said metal substrate so as to cover said perforated pores, wherein an organic coating is coated on at least one side of covering portions of said metal foil.

Further, it is a method of forming a protection film of a safety valve element for a battery, wherein an organic coating is coated on a safety valve element for a battery comprising a metal substrate having perforated pores and a metal foil laminated on said metal substrate so as to cover said perforated pores after said safety valve element for a battery is applied on a closing plate for a battery container having a perforated pore which is to be a valve opening of a safety valve so that said perforated pores of said metal substrate of safety valve element for a battery and said perforated pore of said closing plate are connected through, and said metal substrate and said closing plate are adhered together using adhering means so that both adhere around said perforated pore of said closing plate, and it is characterized that said means is laser beam welding.

Further, the present invention is a safety valve element for a battery comprising a metal substrate having perforated pores and a metal foil laminated on said metal so as to cover said perforated pores, wherein a protection film is covered on at least one side of said safety valve element for a battery.

It is characterized that said protection film is a coated film of an organic coating or a laminated film of an organic resin film.

Further, it is a safety valve element for a battery comprising a metal substrate having perforated pore or first hole extending therethrouh, and a metal foil laminated on said metal substrate so as to cover said perforated pores, wherein a protection film is covered on at least one side of covering portions of said metal foil of a safety valve element for a battery, and it is characterized that said protection film is a coated film of an organic coating.

Further, the present invention is a closing plate, wherein said safety valve element for a battery is applied on a closing plate for a battery container having a perforated pore or second hole extending therethrough which is to be a valve opening of a safety valve so that said perforated pore of said metal substrate of safety valve element for a battery and said perforated pore of said closing plate are connected through, and said metal substrate and said closing plate are adhered together using adhering means so that both adhere around said perforated pore of said closing plate, or a closing plate, wherein said safety valve element for a battery comprising a metal substrate having perforated pores and a metal foil laminated on said metal substrate so as to cover said perforated pores is applied on a closing plate for a battery container having a perforate pore which is to be a valve opening of a safety valve so that said perforated pores of said metal substrate of safety valve element for a battery and said perforated pore of said closing plate are connected through, and said metal substrate and said closing plate are adhered together using adhering means so that both adhere around said perforated pore of said closing plate, and after that an organic coating is coated on said safety valve element for a battery, and it is characterized that said adhering means is laser beam welding.

Furthermore, the present invention is a closed battery, wherein an electrode comprising a positive electrode, a negative electrode and a separator is packed with electrolyte into a battery container and an opening portion of said battery container is closed so that said a closing plate for battery is put not and fixed around inner circumference of said opening portion of said battery container.

BEST MODE FOR CARRYING OUT THE INVENTION

The examples of a safety valve coated with a protection film and a method of making a protection film of the present invention are now explained below with reference to drawings.

EXAMPLE 1

Figure 1:
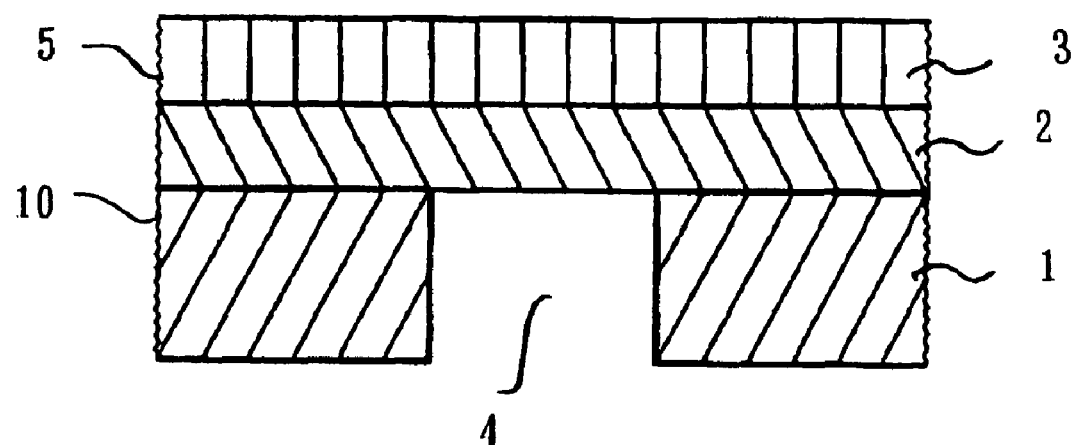
FIG. 1 is schematic sectional view showing an example of a safety valve element covered by protection film of the present invention.
Figure 2:
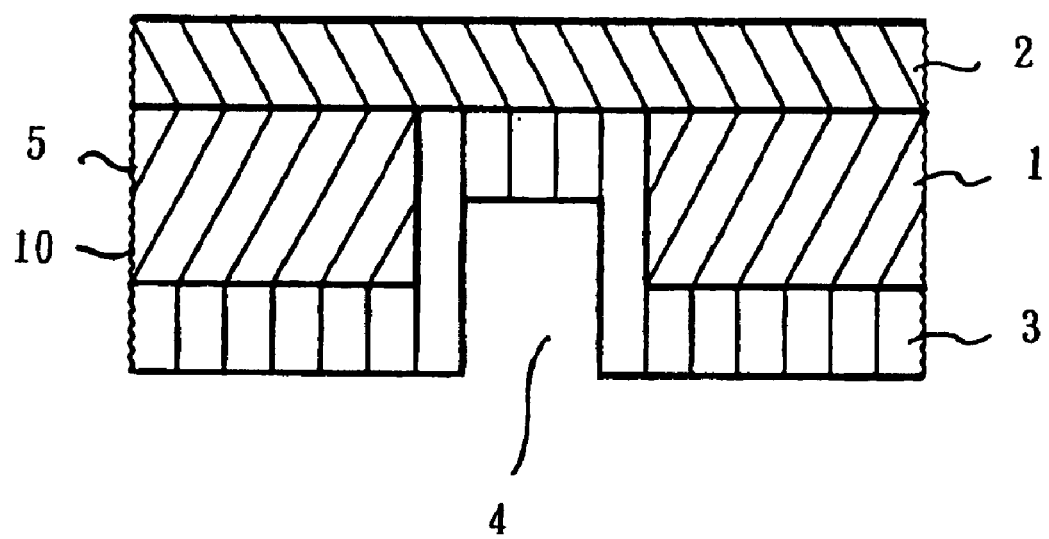
FIG. 2 is schematic sectional view showing the other example of a safety valve element covered by protection film of the present invention.

FIG. 1 and FIG. 2 are sectional views which show the examples of a safety valve element coated with a protection film of the present invention.

As shown in FIG. 1, a safety valve element 10 is provided with a protection film 3 formed on a metal foil 2 of a laminated board 5 which is laminated with metal foil 2 so as to cover perforated pore 4 on one side of a metal substrate 1 having perforated pore 4 which is to be an opening of a safety valve.

As shown in FIG. 2, a safety valve element is provided with a protection film 3 formed on a metal substrate 1, a side wall portion of perforated pore 4 and a portion where metal foil 2 covers perforated pore 4.

That is, a protection film 3 covers all around cavity which is composed of metal foil 2 and perforated pore 4 formed on a metal substrate 1 and connects with a protection film 3 covering a metal substrate 1.

As examples are shown in FIG. 1 and FIG. 2, a protection film 3 is formed at least on the whole surface to be the outside of safety valve element 10 in a battery container.

Each safety valve element 10 of the present invention is produced as follows.

At first, a strip of laminate 5 is produced by laminating metal foil 2 on one side of a strip of metal substrate 1 having plural numbers of perforated pore 4 to be the opening of valve so as to cover the perforated pore 4.

Though perforated pore 4 is usually circle having a diameter of 1 to 10 mm, it may be oval having major axis of 1 to 10 mm or polygon having same size of the circle with said diameter.

Further, a form of perforated pore 4 can be a segment having a certain width (for example, straight or curved slit etc.) or geometric pattern combined with said figures.

It is preferable that perforated pore 4 is geometrically arranged in such a pattern of lattice, zigzag or a like, and pitch of each perforated pore 4 is properly selected by the required size of a safety valve material.

Perforated pore 4 can be formed from a thin cold-rolled metal sheet by usual perforating method such as punching press or etching.

Metal substrate 1 forming perforated pore 4 as mentioned above and metal foil 2 are cold-pressure-bonded in a vacuum using a method for example disclosed in Japanese Patent Laid-open Publication No. HEI-1-224184.

That is, after activating a surface of a metal substrate 1 and a metal foil 2 to be laminated each other by spattering in etching chamber, they are cold-pressure-bonded using a rolling unit in a vacuum chamber.

Thus, a strip of laminate 5 of the present invention is produced.

In an example shown in FIG. 1, a protection film 3 is formed by coating and subsequent drying or baking an organic resin coating on whole surface of a metal foil 2 of a strip of laminate 5 produced as mentioned above.

Further, a protection film 3 is formed by laminating an organic resin film on whole surface of metal foil 2 of a strip of laminate 5.

In this way, a strip of laminate covered by protection film wherein plural numbers of perforated pore 4 formed on a metal substrate 1 are covered by metal foil 2 and protection film 3.

A lot of safety valve elements 10 for battery can be obtained from a strip of laminate covered by a protection film by punching in such a manner that at least one perforated pore is included in each safety valve element.

In a example shown in FIG. 2, a protection film 3 is formed by coating and subsequent drying or baking an organic resin coating on the whole surface of the side which is a metal substrate 1 of a strip of laminate 5, a side wall portion of perforated pore 4 formed on a metal substrate 1 and a portion where metal foil 2 covers perforated pore 4.

Coating is carried out by spraying or dripping a liquid coating into perforated pore.

In this way, a strip of laminate covered by a protection film wherein plural numbers of perforated pore 4 formed on metal substrate are covered by metal foil 2 and metal substrate 7 and a side wall portion and bottom portion of perforated pore 4 are covered by protection film 3.

A lot of safety valve elements 10 for battery can be obtained from a strip of laminate covered by protection film by punching in such a manner that at least one perforated pore is included in each safety valve element.

Said metal substrate is preferably any of steel sheet, stainless steel sheet, copper sheet and aluminum sheet.

The sheet thickness is usually 0.03 to 0.50 mm from the point of view of strength, economy and adhesion to a closing plate for battery container and 0.05 to 0.10 mm is more preferable.

A safety valve element for battery of the present invention aims to operate at a low pressure 30 kgf/cm$^2$ or less, preferably 20 kgf/cm$^2$ or less.

Therefore, the thickness of a metal foil of the present invention is preferably 5 to 50 $\mu$m.

If the thickness is 5 $\mu$m or less, it easily fractures by an impact like a fall when it is applied to a safety valve for battery or like.

On the other hand, if the thickness is 50 $\mu$m or more, it is not fractured by a pressure of 30 kgf/cm$^2$ or less even when a metal having a small tensile strength is applied, but fractured only when high pressure is loaded, a battery container itself burst, fragments scatter, and electrolyte sputter out scatters, which causes damage of safety declines and disadvantage of cost.

Metal foil is preferably any of steel foil, stainless steel foil, copper foil, aluminum foil, nickel foil and nickel-iron alloy foil.

Further, it is possible to use every metal foil as long as it is stable against electrolyte which is filled in a battery container, and it is not corroded and a large amount of reacted gases is not generated.

It is possible to use metal foil of zinc, lead, copper alloy such as brass, bronze, phosphor bronze, gun metal or monel, aluminum alloy such as duralumin and so on in addition to the above metal foils.

Above mentioned organic resin coating is preferably coating of fluorine contained resin, epoxy resin, vinyl resin, urethane resin, polyester resin and acrylic resin, which is coated by any of spray coating, roll coating, bar coating and brush coating and so on.

Further, said organic resin film is preferably film which is produced from any of polyolefin resin, polyester resin, polyamide resin, polycarbonate resin and poly vinyl chloride resin.

Those resin films are directly adhered to be above mentioned laminate by thermally melt-bonding or sticked to be it by interposing primer.

The thickness of those organic resin coating or film is preferably 1 to 30 $\mu$m, more preferably 5 to 20 $\mu$m.

If the thickness is 1 $\mu$m or less, it is difficult to completely coat metal foil of a coating foundation in the case of coating, and it is very difficult to make film in the case of a resin film. On the other hand, if the thickness is 30 $\mu$m or more, it is not fractured at a prescribed loading pressure but fractured only when a loading pressure exceeding the prescribed fracturing pressure is loaded, which causes damage of safety and disadvantage of cost.

EXAMPLE 2

Figure 3:
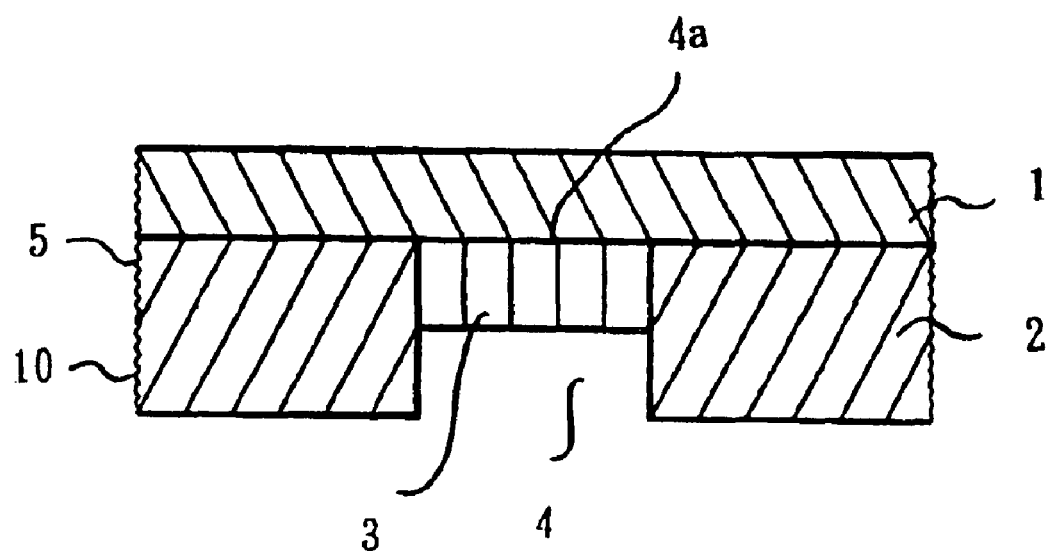
FIG. 3 is schematic sectional view showing another example of a safety valve element covered by protection film of the present invention.

FIG. 3 is a sectional views showing another example of a safety valve element for battery covered by a protection film of the present invention.

As shown in FIG. 3, a safety valve element 10 of the present invention can be provided with a protection film 3 in such a manner that an organic resin is dripped and dried for solidifying at portion 4a of metal foil 2 where metal foil 2 covers perforated port 4 formed on laminates composed of metal substrate 1 having perforated pore 4 which is to be the opening of safety valve covered by metal foil 2 so as to close perforated pore 4.

EXAMPLE 3

Figure 4:
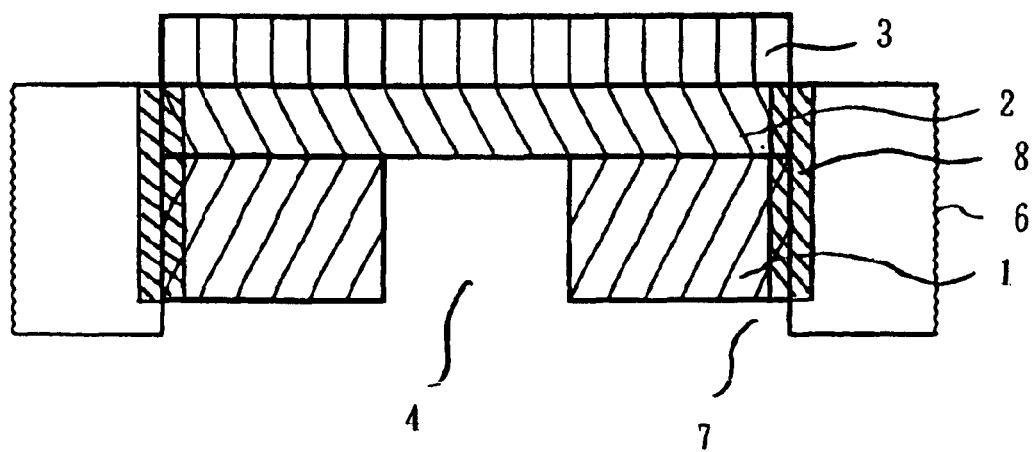
FIG. 4 is schematic sectional view showing an example of a closing plate of a battery having a safety valve element adhered to it.
Figure 5:
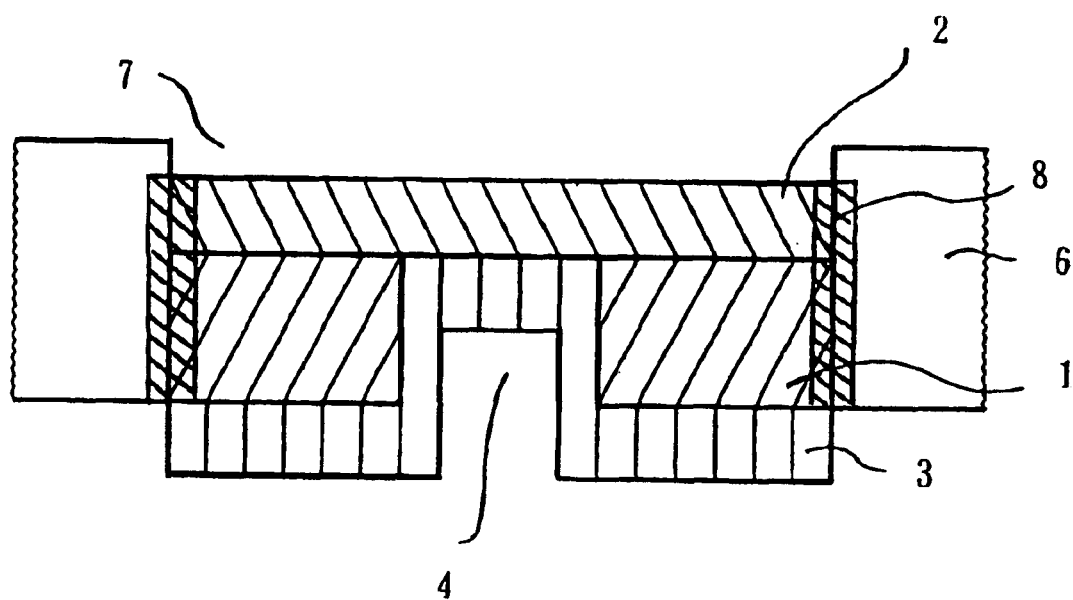
FIG. 5 is schematic sectional view showing the other example of a closing plate of a battery having a safety valve element adhere to it.
Figure 6:
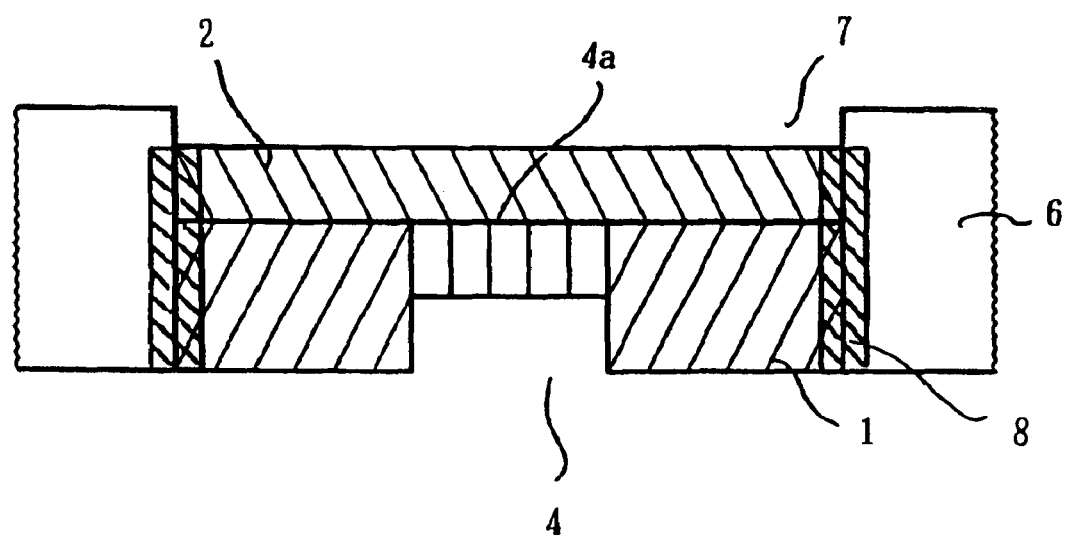
FIG. 6 is schematic sectional view showing another example of a closing plate of a battery having a safety valve element adhere to it.

The produced safety valve element 10 of the present invention is shown in FIG. 4~FIG. 6. The perforated pore 4 of a metal substrate 1 of a safety valve element 10 and perforated pore 7 of a closing battery 6 for battery container is put together so as to overlap both, and then a safety valve element 10 is adhered by a method of laser beam welding a round perforation 7.

FIG. 4 show the case that a safety valve element having a structure shown in FIG. 1 is adhered to a closing plate for a battery container.

FIG. 5 and FIG. 6 show the case that a safety valve element having a structure shown in FIG. 2 and FIG. 3, respectively is adhered to a closing plate of a battery.

The method of adhering is not only said laser beam welding but also any method of adhering using adhesive such as thermosetting resin adhesive and thermoplastic resin adhesive and rubber adhesive as long as necessary adhering strength is obtained.

Though FIG. 4~FIG. 6 show the case of adhesion that one of perforated pore 7 of a closing plate 6 for a battery and one of perforated pore 4 of a metal substrate 1 of a safety valve element 10 are connected through so as to overlap both pores and then both is adhered, but it is possible that one of perforated pore of a closing plate 6 for a battery and plural numbers of perforated pore 4 of a metal substrate 1 of a safety valve element 10 are connected through so as to overlap both pores and then both is adhered.

Said closing plate is preferably any of the same steel sheet, stainless steel sheet, copper sheet, aluminum sheet as above mentioned metal substrate.

Thickness of a sheet is usually 0.03 to 0.50 mm from point of view of strength, economy and easiness of adhering to a closing plate of a battery, and 0.05 to 0.10 mm is more preferable.

EXAMPLE 4

Figure 7:
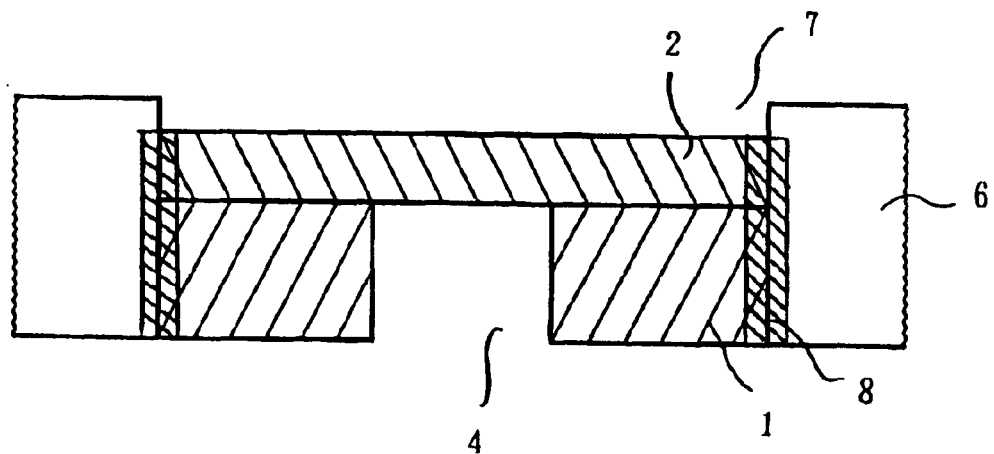
FIG. 7(a) is schematic sectional view showing an example of a closing plate of a battery having a safety valve element adhered to it before it is covered by a protection film.
FIG. 7(b) is schematic sectional view showing an example of a closing plate of a battery having a safety valve element adhered to it after it is covered by a protection film.
Figure 7:
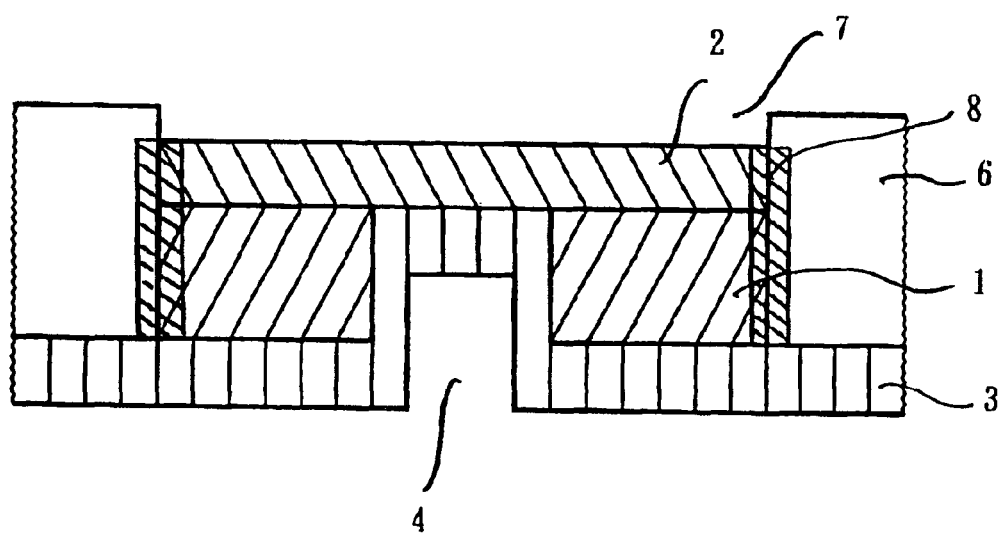
Figure 8:
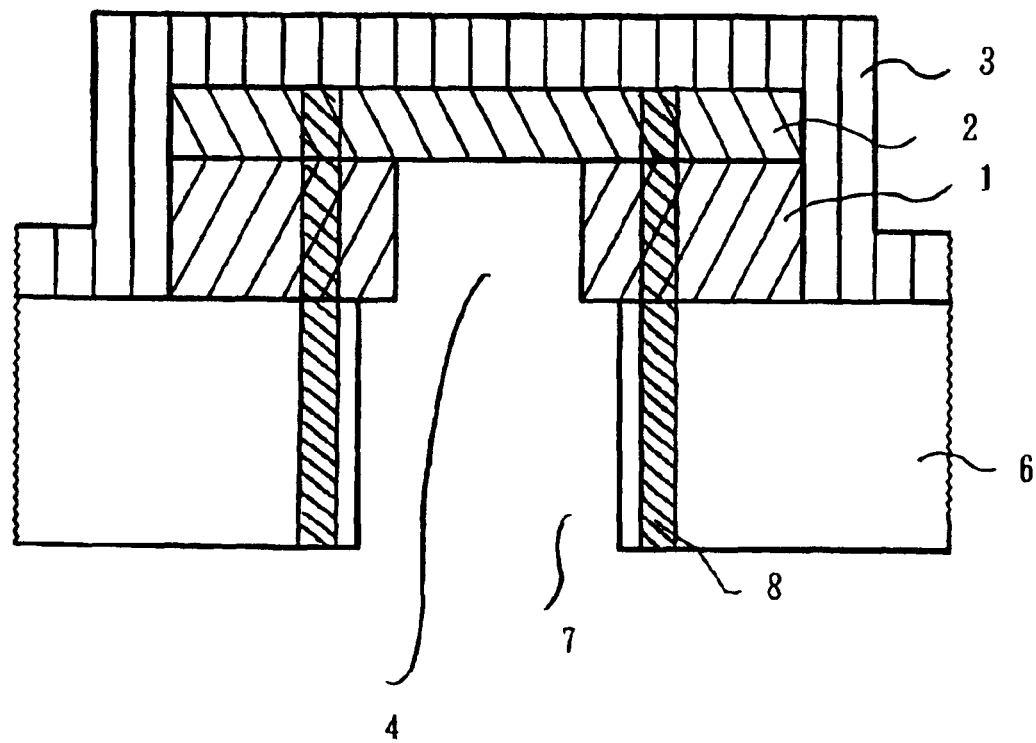
FIG. 8 is schematic sectional view showing another example of a closing plate of a battery having a safety valve element adhere to it.

Further, as shown in FIG. 7(a) and FIG. 7(b), a closing plate for a battery container to which a safety valve element for a battery covered by a protection film of the present invention can also be produced.

After a perforated pore 4 of a metal substrate 1 of a safety valve element 10 and a perforation 7 of a closing plate 6 of a battery container is put together so as to be overlapped, both are glued by a method of a laser beam welding around a perforation 7 as shown in FIG. 7(a).

As shown in FIG. 7(b), there can be provided a protection film 3 consisting of an organic coating on a safety valve element of a battery which include a weld part.

Like this, because a protection film is coated on both a metal foil which blockades perforation and a naked metal part of a safety valve element welded by a laser beam, a metal part cannot be attacked in whenever corrosive electrolyte adheres.

EXAMPLE 5

Though FIG. 4~FIG. 7 show structures of that perforated pore 4 of overlapping a perforated metal substrate 1 of a safety valve element 10 and perforation 7 of a closing plate 6 so as to put in and glue a safety valve element 10 whose diameter is equal to that of perforated pore 7 of a closing plate 6 to perforated pore 7 of a closing plate 6, it is possible to pile and glue a safety valve element 10 whose diameter is bigger than that of perforated pore 7 to a closing plate 6.

A closing plate of a battery which adhere a safety valve element coated with a protection film blockade a opening of said battery container which electrode support to put in with electrolyte and a closing battery of the present invention is made.

POSSIBILITY OF USE IN INDUSTRY

The present invention is a method of forming a protection film of a safety valve element of a battery and a safety valve element using it.

There is provided a protection film of safety valve element coated with an organic coating or a film of an organic resin at least one side of a safety valve element which consist of a perforated metal substrate and a metal foil laminated on said perforated substrate so as to blockade said perforation.

Further, the present invention is a closing plate for a closed battery characterized that the closing plate for a battery container having a perforated pore which is to be the opening of valve and the metal substrate of the safety valve element for a battery are attached each other in such a manner that the perforated pore of the metal substrate and the perforated pore of the closing plate are connected through, and then both is adhered around the perforated pore of the closing plate using adhering means.

Furthermore, the present invention is a closed battery characterized that an electrode comprising a positive electrode, a negative electrode and a separator is packed with electrolyte into a battery container and an opening portion of the battery container is closed so that the closing plate for battery is put into and fixed around inner circumference of the opening portion of the battery container.

A closed battery using a closing plate of the present invention contains a lithium fluoride as a supporting electrolyte, and metallic materials comprising a battery container and safety valve element are not corroded. But the fluoride absorbs moisture in the atmosphere and change into hydrofluoride acid which has strong corrosion. When non aqueous electrolyte having such a strong corrosion scatters and sticks to the outside of a battery container, a metal foil of a safety valve element, in particular, the thin metal foil is corroded and perforated. In case of the safety valve element of the present invention, since it has a protection film on the metal foil, the thin metal foil is neither corroded nor perforated.

What is claimed is:

1. A method of forming a protection film of a safety valve element for a battery, wherein an organic coating is coated on a safety valve element for a battery comprising a metal substrate having a first hole extending therethrough and a metal foil laminated to said metal substrate so as to cover said first hole after said safety valve element for a battery is applied on a closing plate for a battery container having a second hole extending through said closing plate which is to be a valve opening of a safety valve so that said first hole of said metal substrate of safety valve element for a battery and said second hole of said closing plate are connected through, and said metal substrate and said closing plate are adhered together so that both adhere around said second hole of said closing plate.

2. A method of forming a protection film of a safety valve element for a battery according to claim 1, wherein said adhering together of said metal substrates and said closing plate is carried out by laser beam welding.

3. A safety valve element for a battery comprising
a metal substrate having a first hole extending therethrough and a metal foil laminated on said metal substrate so as to cover said first hole,
wherein a protection film is covered on at least one side of said safety valve element for a battery;
wherein said safety element for a battery is applied on a closing plate for a battery container having a second hole extending through said closing plate which is to be a valve opening of a safety valve so that said first hole of said metal substrate of safety valve element for a battery and said second hole of said closing plate are connected through, and said metal substrate and said closing plate are adhered together so that both adhere around said second hole of said closing plate.

4. A closing plate, wherein a safety element for a battery comprising a metal substrate having a first hole extending therethrough and a metal foil laminated on said metal substrate so as to cover said first hole is applied on a closing plate for a battery container having a second hole extending through said closing plate which is to be a valve opening of a safety valve so that said first hole of said metal substrate of safety valve element for a battery and said second hole of said closing plate are connected through, and said metal substrate and said metal closing plate are adhered together so that both adhere around said second hole of said closing plate, and after that an organic coating is coated on said safety valve element for a battery.

5. A closing plate according to claim 3, wherein said adhering together of said metal substrates and said closing plate is carried out by laser beam welding.

6. A closing battery, wherein an electrode comprising a positive electrode, a negative electrode and a separator is packed with electrolyte into a battery container and opening portion of said battery container is closed so that said closing plate for battery according to claim 3 is put into and fixed around inner circumference of said opening portion of said battery container.

7. A closing plate according to claim 4, wherein said adhering together of said metal substrates and said closing plate is carried out by laser beam welding.

8. A closed battery, wherein an electrode comprising a positive electrode, a negative electrode and a separator is packed with electrolyte into a battery container and opening portion of said battery container is closed so that said closing plate for battery according to claim 7 is put into and fixed around inner circumference of said opening portion of said battery container.

9. A closed battery, wherein an electrode comprising a positive electrode, a negative electrode and a separator is packed with electrolyte into a battery container and opening portion of said battery container is closed so that said closing plate for battery according to claim 4 is put into and fixed around inner circumference of said opening portion of said battery container.

10. A safety valve element for a battery comprising a metal substrate having a first hole extending therethrough and a metal foil laminated on said metal substrate so as to cover said first hole, wherein a protection film is covered on at least one side of said safety valve element for a battery;
wherein said protection film is a continuous coated film of an organic coating; and
wherein said safety valve element for a battery is applied on a closing plate for a battery container having a second hole extending through said closing plate which is to be a valve opening of a safety valve so that said first hole of said metal substrate of safety valve element for a battery and said second hole of said closing plate are connected through, and said metal substrate and said closing plate are adhered together so that both adhere around said second hole of said closing plate.

11. A safety valve element for a battery comprising a metal substrate having a first hole extending therethrough and a metal foil laminated on said metal substrate so as to cover said first hole, wherein a protection film is covered on at least one side of said safety valve element for a battery;

wherein said protecting film is an uncut laminated film of an organic resin film; and wherein said safety valve element for a battery is applied on a closing plate for a battery container having a second hole extending through said closing plate which is to be a valve opening of a safety valve so that said first hole of said metal substrate of safety valve element for a battery and said second hole of said closing plate are connected through, and said metal substrate and said closing plate are adhered together so that both adhere around said second hole of said closing plate.

* * * * *